United States Patent
Zhou et al.

(10) Patent No.: US 12,500,782 B2
(45) Date of Patent: Dec. 16, 2025

(54) METHOD FOR REFRESHING ELECTRONIC SIGN AND ELECTRONIC DEVICE

(71) Applicants: BOE Intelligent IoT Technology Co., LTD., Beijing (CN); BOE Technology Group Co., Ltd., Beijing (CN)

(72) Inventors: Kaiyuan Zhou, Beijing (CN); Weihua Li, Beijing (CN); Naichuan Chen, Beijing (CN); Linyi Fan, Beijing (CN); Mingwu Chen, Beijing (CN)

(73) Assignees: BOE Intelligent IoT Technology Co., LTD., Beijing (CN); BOE Technology Group Co., Ltd., Beijing (CN)

( * ) Notice: Subject to any disclaimer, the term of this patent is extended or adjusted under 35 U.S.C. 154(b) by 24 days.

(21) Appl. No.: 18/293,890

(22) PCT Filed: Jan. 3, 2023

(86) PCT No.: PCT/CN2023/070190
§ 371 (c)(1),
(2) Date: Jan. 31, 2024

(87) PCT Pub. No.: WO2023/142909
PCT Pub. Date: Aug. 3, 2023

(65) Prior Publication Data
US 2024/0340191 A1 Oct. 10, 2024

(30) Foreign Application Priority Data
Jan. 29, 2022 (CN) .......................... 202210112174.1

(51) Int. Cl.
H04L 12/18 (2006.01)
H04W 4/80 (2018.01)

(52) U.S. Cl.
CPC ........... *H04L 12/1818* (2013.01); *H04W 4/80* (2018.02)

(58) Field of Classification Search
CPC ............................ H04L 12/1818; H04W 4/80
See application file for complete search history.

(56) References Cited

U.S. PATENT DOCUMENTS 6,711,414 B1 * 3/2004 Lightman .............. G06Q 30/02
455/457
9,002,944 B2 * 4/2015 Lewis ...................... G07C 9/22
709/204
(Continued)

FOREIGN PATENT DOCUMENTS

CN 107040978 A 8/2017
CN 107330661 A 11/2017
(Continued)

OTHER PUBLICATIONS

Chinese Office Action, mailed Aug. 23, 2024, from Chinese Patent Application No. 202210112174.1, 14 pages.

*Primary Examiner* — Nazia Naoreen
(74) *Attorney, Agent, or Firm* — Workman Nydegger

(57) ABSTRACT

A method for refreshing electronic sign and an electronic device, where the method includes acquiring conference information and attendee information of a scheduled conference; where the conference information includes a Bluetooth gateway corresponding to the conference information; transmitting the attendee information to an electronic sign bound with the Bluetooth gateway by the Bluetooth gateway corresponding to the conference information; and, when there are multiple Bluetooth gateways, the electronic sign is bound with only one Bluetooth gateway; and displaying the attendee information by refreshing the electronic sign.

18 Claims, 8 Drawing Sheets

(56) References Cited

U.S. PATENT DOCUMENTS

| | | | |
|---|---|---|---|
| 9,973,269 B2 * | 5/2018 | Sarkar | G06Q 10/00 |
| 10,783,593 B2 * | 9/2020 | Carver | G06Q 50/01 |
| 2004/0045007 A1 | 3/2004 | Boland et al. | |
| 2016/0381722 A1 | 12/2016 | Konji | |
| 2020/0169861 A1 * | 5/2020 | Hu | H04W 4/80 |
| 2021/0334057 A1 | 10/2021 | Okigami | |

FOREIGN PATENT DOCUMENTS

| | | |
|---|---|---|
| CN | 108694421 A | 10/2018 |
| CN | 108898203 A | 11/2018 |
| CN | 109088926 A | 12/2018 |
| CN | 109089248 A | 12/2018 |
| CN | 109191061 A | 1/2019 |
| CN | 110310174 A | 10/2019 |
| CN | 110535915 A | 12/2019 |
| CN | 107666687 B | 2/2020 |
| CN | 112700559 A | 4/2021 |
| CN | 112836620 A | 5/2021 |
| CN | 112887369 A | 6/2021 |
| CN | 113902149 A | 1/2022 |
| CN | 114449498 A | 5/2022 |

\* cited by examiner

| Configure conference room | | | | | | |
|---|---|---|---|---|---|---|
| Conference room information | | | | | | Modify |
| Conference room name | | | Location | | | |
| Maximum number of people | | | Scheduled time slots | | | |
| Notes | | | | | | |
| List of devices | | | | | Bind device | One-click setting table card |
| Device name | Device ID | Device type | Device status | Configuration status | Operations | |
| Bluetooth gateway 1 | 10 | Gateway | Online | | Unbind | |
| Bluetooth gateway 2 | | Gateway | | | | |
| Door nameplate 1 | | Door nameplate | Online | Configured | Configure | Unbind |
| Table card 1 | | Table card | Online | Configured | Configure | Unbind |
| Table card 2 | | Table card | Online | Configured | Configure | Unbind |
| Table card 3 | | Table card | Online | Configured | Configure | Unbind |
| Table card 4 | | Table card | | | | |

FIG. 5

| Edit device | |
|---|---|
| Device name | 0831 |
| Device ID | |
| Device type | Bluetooth table card ⌄ |
| Bluetooth gateway | ⌄ |
| Device size | 7.4 inches |
| Resolution ratio | 800*480 |

Cancel　Confirm

FIG. 6

| Conference details | | | | Administrators | Exit |
|---|---|---|---|---|---|

Conference date 2021-8-29    Conference time 12：00-13：00

Location AAAA    Belonging conference room BBBB

Contact Guan    Contact information 010-XXXXXXX

Conference agenda

Attendee

| Name | Position | Refreshing status | Table card | Operations | | | |
|---|---|---|---|---|---|---|---|
| Wang | Administrators | Success | Assigned | Edit | Assign table card | Delete | send |
| Zhang | Manage | Success | Assigned | Edit | Assign table card | Delete | send |
| Li | Staff | Failure | Assigned | Edit | Assign table card | Delete | send |

FIG. 7

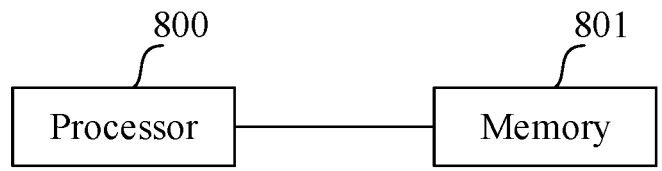

FIG. 8

METHOD FOR REFRESHING ELECTRONIC SIGN AND ELECTRONIC DEVICE

CROSS-REFERENCES TO RELATED APPLICATIONS

The present application is a National Stage of International Application No. PCT/CN2023/070190, filed Jan. 3, 2023, which claims priority to Chinese Patent Application No. 202210112174.1, filed to the China National Intellectual Property Administration on Jan. 29, 2022, the entire contents of which are incorporated herein by reference.

TECHNICAL FIELD

The present disclosure relates to the field of electronic sign technology, and in particular to a method for refreshing electronic sign and an electronic device.

BACKGROUND

Electronic sign products, such as EPD (electronic paper display) signs (display screens using electronic paper display technology), are electronic display devices with information transmitting and receiving functions that can replace traditional paper labels and are often used in different usage scenarios, such as the smart retail, smart office and smart transportation, etc. For conference and office scenarios, common electronic sign products include conference door nameplate, table card, and workstation nameplate.

At present, common electronic sign management systems can realize the production and distribution of display content. In conference scenarios, attendee information is usually displayed through EPD table card. At present, the EPD table card can refresh attendee information. The AP (access point, access point/wireless network) Bluetooth gateway and EPD table card are refreshed through the Bluetooth protocol and adopt an automatic connection mechanism. That is, the EPD table card within the coverage region of the AP Bluetooth gateway can automatically establish a connection with the AP. However, the automatic connection mechanism has mutual interference problems in a multi-conference scenario, which makes the refresh inaccurate and fails to meet the requirements of multiple conferences.

SUMMARY

The present disclosure provides a method for refreshing electronic signs and electronic device, which are configured to solve the problem of mutual interference in table card refreshing caused by the automatic connection mechanism in a multi-conference scenario, resulting in inaccurate refresh and inability to meet the requirements of multiple conferences.

In a first aspect, an embodiment of the present disclosure provides a method for refreshing an electronic sign. The method includes:
  acquiring conference information and attendee information of a scheduled conference; where the conference information includes a Bluetooth gateway corresponding to the conference information;
  transmitting the attendee information to an electronic sign bound with the Bluetooth gateway by means of the Bluetooth gateway corresponding to the conference information; when there are a plurality of Bluetooth gateways, the electronic sign is bound with only one Bluetooth gateway; and
  displaying the attendee information by means of refreshing the electronic sign.

As an optional implementation, when there are a plurality pieces of conference information and the plurality of Bluetooth gateways, one piece of the conference information corresponds to at least one of the plurality of Bluetooth gateways, and different pieces of conference information correspond to different Bluetooth gateways.

As an optional implementation, when there are the plurality of Bluetooth gateways and a plurality of electronic signs, one Bluetooth gateway is bound with at least one of the plurality of electronic signs, and different Bluetooth gateways are bound with different electronic signs.

As an optional implementation, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

As an optional implementation, when one piece of the conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

As an optional implementation, the method further includes:
  retransmitting the attendee information to the electronic sign corresponding to the attendee information for refreshing and displaying in response to an update instruction for the attendee information from a user;
  where the electronic sign corresponding to the attendee information is determined based on the Bluetooth gateway corresponding to the conference information of the scheduled conference related to the attendee information, or an electronic sign specified by the user is used as the electronic sign corresponding to the attendee information.

As an optional implementation, the method further includes:
  editing the attendee information in response to an editing instruction for the attendee information from a user, and transmitting edited attendee information to the electronic sign corresponding to the attendee information for refreshing and displaying; and/or,
  modifying the attendee information in response to a modifying instruction for the attendee information from a user, and retransmitting modified attendee information to the electronic sign corresponding to the attendee information for refreshing and displaying;
  where the electronic sign corresponding to the attendee information is determined based on the Bluetooth gateway corresponding to the conference information of the scheduled conference related to the attendee information, or an electronic sign specified by the user is used as the electronic sign bounded with to the attendee information.

As an optional implementation, the method further includes:
  receiving a modifying instruction for the attendee information from a user from a first time point before the scheduled conference begins to a second time point before the scheduled conference ends.

As an optional implementation, the method further includes:
receiving an editing instruction for the conference information and/or the attendee information of the scheduled conference from a user within a first preset time duration before the scheduled conference begins.

As an optional implementation, the method further includes:
refusing the editing instruction for the conference information and/or the attendee information of the scheduled conference from a user within a second preset time duration before the scheduled conference begins;
where the second preset time duration is after the first preset time duration.

In a second aspect, an electronic device provided by an embodiment of the present disclosure includes a processor and a memory, the memory is configured to store programs executable by the processor, and the processor is configured to read the programs in the memory to:
acquire conference information and attendee information of a scheduled conference; where the conference information includes a Bluetooth gateway corresponding to the conference information;
transmit the attendee information to an electronic sign bound with the Bluetooth gateway by means of the Bluetooth gateway corresponding to the conference information; when there are a plurality of Bluetooth gateways, the electronic sign is bound with only one Bluetooth gateway; and
display the attendee information by means of refreshing the electronic sign.

As an optional implementation, when there are a plurality pieces of conference information and the plurality of Bluetooth gateways, one piece of the conference information corresponds to at least one of the plurality of Bluetooth gateways, and different pieces of conference information correspond to different Bluetooth gateways.

As an optional implementation, when there are the plurality of Bluetooth gateways and a plurality of electronic signs, one Bluetooth gateway is bound with at least one of the plurality of electronic signs, and different Bluetooth gateways are bound with different electronic signs.

As an optional implementation, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

As an optional implementation, when one piece of the conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

As an optional implementation, the processor is further configured to:
retransmit the attendee information to the electronic sign corresponding to the attendee information for refreshing and displaying in response to an update instruction for the attendee information from a user;
where the electronic sign corresponding to the attendee information is determined based on the Bluetooth gateway corresponding to the conference information of the scheduled conference related to the attendee information, or an electronic sign specified by the user is used as the electronic sign corresponding to the attendee information.

As an optional implementation, the processor is further configured to:
edit the attendee information in response to an editing instruction for the attendee information from a user, and transmitting edited attendee information to the electronic sign corresponding to the attendee information for refreshing and displaying; and/or,
modify the attendee information in response to a modifying instruction for the attendee information from a user, and retransmitting modified attendee information to the electronic sign corresponding to the attendee information for refreshing and displaying;
where the electronic sign corresponding to the attendee information is determined based on the Bluetooth gateway corresponding to the conference information of the scheduled conference related to the attendee information, or an electronic sign specified by the user is used as the electronic sign bounded with the attendee information.

As an optional implementation, the processor is further configured to:
receive a modifying instruction for the attendee information from a user from a first time point before the scheduled conference begins to a second time point before the scheduled conference ends.

As an optional implementation, the processor is further configured to:
receive an editing instruction for the conference information and/or the attendee information of the scheduled conference from a user within a first preset time duration before the scheduled conference begins.

As an optional implementation, the processor is further configured to:
stop receiving the editing instruction for the conference information and/or the attendee information of the scheduled conference from a user within a second preset time duration before the scheduled conference begins;
where the second preset time duration is after the first preset time duration.

In a third aspect, an embodiment of the present disclosure also provides an electronic sign refreshing device, including:
an acquiring conference information unit, configured to acquire conference information and attendee information of a scheduled conference; where the conference information includes a Bluetooth gateway corresponding to the conference information;
a transmitting attendee information unit, configured to transmit the attendee information to an electronic sign bound with the Bluetooth gateway by means of the Bluetooth gateway corresponding to the conference information; when there are a plurality of Bluetooth gateways, the electronic sign is bound with only one Bluetooth gateway; and
a sign refreshing display unit, configured to display the attendee information by means of refreshing the electronic sign.

As an optional implementation, when there are a plurality pieces of conference information and the plurality of Bluetooth gateways, one piece of the conference information corresponds to at least one of the plurality of Bluetooth gateways, and different pieces of conference information correspond to different Bluetooth gateways.

As an optional implementation, when there are the plurality of Bluetooth gateways and a plurality of electronic signs, one Bluetooth gateway is bound with at least one of the plurality of electronic signs, and different Bluetooth gateways are bound with different electronic signs.

As an optional implementation, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

As an optional implementation, when one piece of the conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

As an optional implementation, the electronic device further includes a first refresh unit, configured to:
  retransmit the attendee information to the electronic sign corresponding to the attendee information for refreshing and displaying in response to an update instruction for the attendee information from a user;
  where the electronic sign corresponding to the attendee information is determined based on the Bluetooth gateway corresponding to the conference information of the scheduled conference related to the attendee information, or an electronic sign specified by the user is used as the electronic sign corresponding to the attendee information.

As an optional implementation, the electronic device further includes a second refresh unit, configured to:
  edit the attendee information in response to an editing instruction for the attendee information from a user, and transmit edited attendee information to the electronic sign corresponding to the attendee information for refreshing and displaying; and/or,
  modify the attendee information in response to a modifying instruction for the attendee information from a user, and retransmit modified attendee information to the electronic sign corresponding to the attendee information for refreshing and displaying;
  where the electronic sign corresponding to the attendee information is determined based on the Bluetooth gateway corresponding to the conference information of the scheduled conference related to the attendee information, or an electronic sign specified by the user is used as the electronic sign bounded with the attendee information.

As an optional implementation, the electronic device further includes a modification unit, configured to:
  receive a modifying instruction for the attendee information from a user from a first time point before the scheduled conference begins to a second time point before the scheduled conference ends.

As an optional implementation, the electronic device further includes an editing unit, configured to:
  receive an editing instruction for the conference information and/or the attendee information of the scheduled conference from a user within a first preset time duration before the scheduled conference begins.

As an optional implementation, the electronic device further includes a stop unit, configured to:
  stop receiving the editing instruction for the conference information and/or the attendee information of the scheduled conference from a user within a second preset time duration before the scheduled conference begins;
  where the second preset time duration is after the first preset time duration.

In a fourth aspect, embodiments of the present disclosure also provide a non-transitory computer storage medium storing computer programs thereon, where the programs, when executed by a processor, implement the method described in the first aspect.

These and other aspects of the present disclosure will be more clearly understood in the following description of the embodiments.

BRIEF DESCRIPTION OF FIGURES

In order to more clearly illustrate the technical solutions in embodiments of the present disclosure, a brief introduction will be given below to the drawings needed to be used in the description of the embodiments. Obviously, the drawings in the following description are only some embodiments of the present disclosure. Those of ordinary skill in the art can also obtain other drawings based on these drawings without exerting any creative effort.

FIG. 5 is a schematic diagram of a conference template configuration interface provided by an embodiment of the present disclosure.

FIG. 6 is a schematic diagram of a configuration interface of a gateway and an electronic sign provided by an embodiment of the present disclosure.

FIG. 7 is a schematic diagram of a manual refresh interface of an electronic sign provided by an embodiment of the present disclosure.

FIG. 8 is a schematic diagram of an electronic device provided by an embodiment of the present disclosure.

DETAILED DESCRIPTION

In order to make the purpose, technical solutions and advantages of the embodiments of the present disclosure more clear, the technical solutions of the embodiments of the present disclosure will be detailed description below in conjunction with the drawings of the embodiments of the present disclosure. Apparently, embodiments described are some rather than all of embodiments of the present disclosure. All the other embodiments derived by a person of ordinary skill in the art from the described embodiments of the present disclosure without creative efforts shall fall within the protection scope of the present disclosure.

In embodiments of the present disclosure, the term "and/or" describes the association relationship of associated objects, indicating that there can be three relationships, for example, A and/or B, which can mean three situations: A exists alone, A and B exist simultaneously, and B exists alone. The character "/" generally indicates that the related objects are in an "or" relationship.

The application scenarios described in embodiments of the present disclosure are to more clearly illustrate the technical solutions of the embodiments of the present disclosure, and do not constitute a limitation on the technical solutions provided by the embodiments of the present disclosure. Those of ordinary skill in the art will know that with the emergence of new application scenarios, the technical solutions provided by the embodiments of the present disclosure are also applicable to similar technical problems. Among them, in the description of the present disclosure, unless otherwise specified, the term "plurality/multiple" means two or more.

Embodiment 1, Electronic sign products, such as EPD signs (display screens using electronic paper display technology), are electronic display devices with information transmitting and receiving functions that can replace traditional paper labels and are often used in different usage scenarios, such as the smart retail, smart office and smart transportation, etc. For conference and office scenarios, common electronic sign products include conference door nameplate, table card, and workstation nameplate. At present, common electronic sign management systems can realize the production and distribution of display content. In conference scenarios, attendee information is usually displayed through EPD table card. At present, the EPD table card can refresh attendee information. The AP Bluetooth gateway and EPD table card are refreshed through the Bluetooth protocol and adopt an automatic connection mechanism. That is, the EPD table card within the coverage region of the AP Bluetooth gateway can automatically establish a connection with the AP. However, the automatic connection mechanism has mutual interference problems in a multi-conference scenario, which makes the refresh inaccurate and fails to meet the requirements of multiple conferences.

Figure 1:
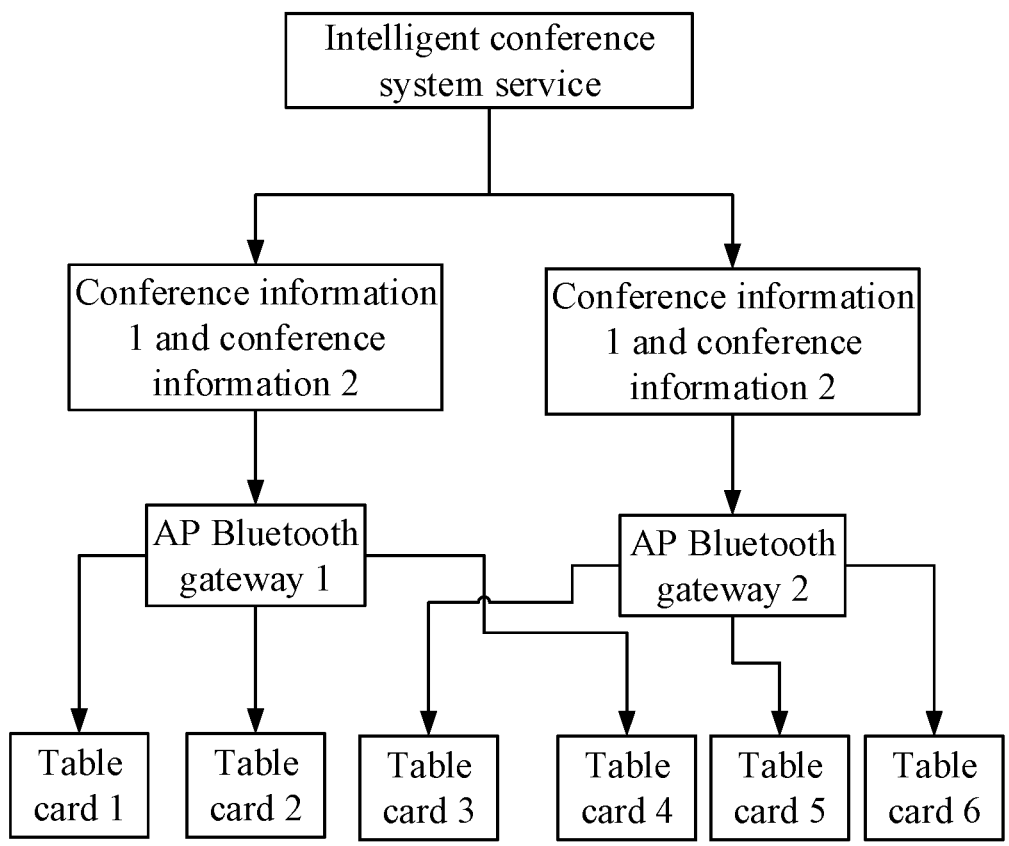
FIG. 1 is an architecture schematic diagram of a current intelligent conference system service provided by an embodiment of the present disclosure.

As shown in FIG. 1, in the architecture schematic diagram of the current intelligent conference system service, the AP Bluetooth gateways each can receive all conference information, and different conference information will not be isolated. The AP Bluetooth gateway and table card are refreshed through the Bluetooth protocol and adopt an automatic connection mechanism. That is, the table card within the coverage region of the AP Bluetooth gateway can automatically establish a connection with the AP Bluetooth gateway. The AP Bluetooth gateway is connected with the server of the intelligent conference system through the http protocol and uses the mqtt transmission protocol for long-distance transmission. The server of the intelligent conference system transmits information to a designated table card, acquires the AP Bluetooth gateway associated with the table card, transmits the conference information to the AP Bluetooth gateway and refreshes it. The refresh mechanism based on the architecture of current intelligent conference system service cannot meet the requirements in the multi-conference scenario. On the one hand, the automatic connection method between the AP Bluetooth gateway(s) and the table card(s) has mutual interference problems in the multi-conference scenario. For example, when two conferences are conducted at the same time, before the begin of the two conferences, attendee information will be transmitted to an AP Bluetooth gateway and forwarded to the table card with a connection relationship through the AP Bluetooth gateway. However, since the AP Bluetooth gateway(s) and the table card(s) are automatically connected, it is easy for the AP Bluetooth gateway to transmit the received attendee information of conference 1 to the table card of conference 2, resulting in inaccurate refresh and related interference. On the other hand, since the current AP Bluetooth gateway can receive all conference information and attendee information, it is easy for information to overlap, which can cause interference when subsequent table cards are refreshed, and when refreshing table cards, one table card needs to be refreshed before another table card is refreshed, resulting in the inability to meet refresh timeliness and low refresh efficiency in multi conference scenarios. On the last aspect, at present, the success rate of automatic refresh, due to various problems such as the network congestion, low power of the table card(s), damage to the hardware terminal (s) (damage of the table card(s)), etc., usually cannot reach 100%.

In order to solve the above technical problems, the embodiments provide a method for refreshing electronic sign. The core idea of the method is to establish a binding relationship between the conference room(s) and the Bluetooth gateway(s), and a binding relationship between the Bluetooth gateway(s) and the electronic sign(s). Based on the binding relationships, the attendee information is transmitted the corresponding electronic sign. Since there is a binding relationship between the electronic sign(s) and the Bluetooth gateway(s) in the embodiments, and one electronic sign is only bound with one Bluetooth gateway, even if the Bluetooth gateway can scan a certain electronic sign, as long as there is no binding relationship between the scanned electronic sign(s) and the Bluetooth gateway(s), the Bluetooth gateway will not transmit the attendee information to the electronic sign, which can effectively avoid interference caused by automatic connection of Bluetooth gateway and electronic sign in multi conference scenarios.

It should be noted that the electronic signs in the embodiments include but are not limited to the EPD sign, e.g., the EPD table card and other electronic display devices with transceiver functions for displaying conference information, which are not too limited in the embodiments. The method in the embodiments can be applied to the server of the intelligent conference system.

Figure 2:
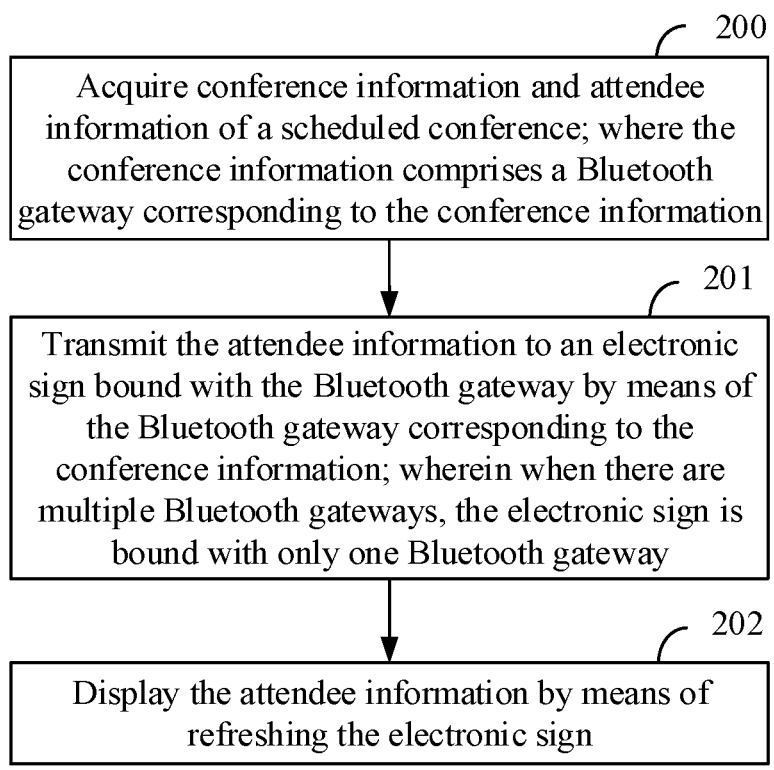
FIG. 2 is an implementation flow chart of a method for refreshing electronic sign provided by an embodiment of the present disclosure.

As shown in FIG. 2, an embodiment of the present disclosure provides a method for refreshing electronic sign. The implementation process of the method is as follows.

Step 200: acquiring conference information and attendee information of a scheduled conference; where the conference information includes a Bluetooth gateway corresponding to the conference information.

In some embodiments, the attendee information in the embodiments is the information about the personnel who will be attending the scheduled conference. The conference information in the embodiments includes the Bluetooth gateway corresponding to the conference information, and further includes but is not limited to at least one of conference room information (e.g., conference room name, conference room ID, conference room number, etc.), conference content, conference theme, and conference start and end time. The attendee information in the embodiments includes but is not limited to at least one of the attendee's name, the company to which the attendee belongs, the department to which the attendee belongs, and the attendee's position.

In some embodiments, the relevant information of the scheduled conference input by the user on the service interface of the intelligent conference system is received, and the conference information and attendee information of the scheduled conference are obtained based on the received relevant information of the scheduled conference.

Step 201: transmitting the attendee information to an electronic sign bound with the Bluetooth gateway by means of the Bluetooth gateway corresponding to the conference information; when there are a plurality of Bluetooth gateways, the electronic sign is bound with only one Bluetooth gateway.

Step 202: displaying the attendee information by means of refreshing the electronic sign.

In the implementation, the conference information has a corresponding relationship with the Bluetooth gateway in the embodiments. The Bluetooth gateway is bound with the electronic sign, which determines the corresponding relationship between the conference information and the electronic sign(s). The conference room information in the conference information can have a binding relationship with the Bluetooth gateway. Through the correspondence among the conference information, the Bluetooth gateway and the electronic sign, the attendee information in the scheduled conference is transmitted to the corresponding electronic sign, which avoids interference problems in multiple conference scenarios.

In some embodiments, when there are a plurality pieces of conference information and the plurality of Bluetooth gateways, one piece of the conference information corresponds to at least one of the plurality of Bluetooth gateways, and different pieces of conference information correspond to different Bluetooth gateways.

In some embodiments, when there are the plurality of Bluetooth gateways and a plurality of electronic signs, one Bluetooth gateway is bound with at least one of the plurality of electronic signs, and different Bluetooth gateways are bound with different electronic signs.

In some embodiments, the conference room information and the electronic sign also have a binding relationship. When there is a plurality pieces of conference room information and a plurality of electronic signs, one piece of conference room information can be bound with at least one electronic sign. Different pieces of conference room information are bound with different electronic signs.

Figure 3:
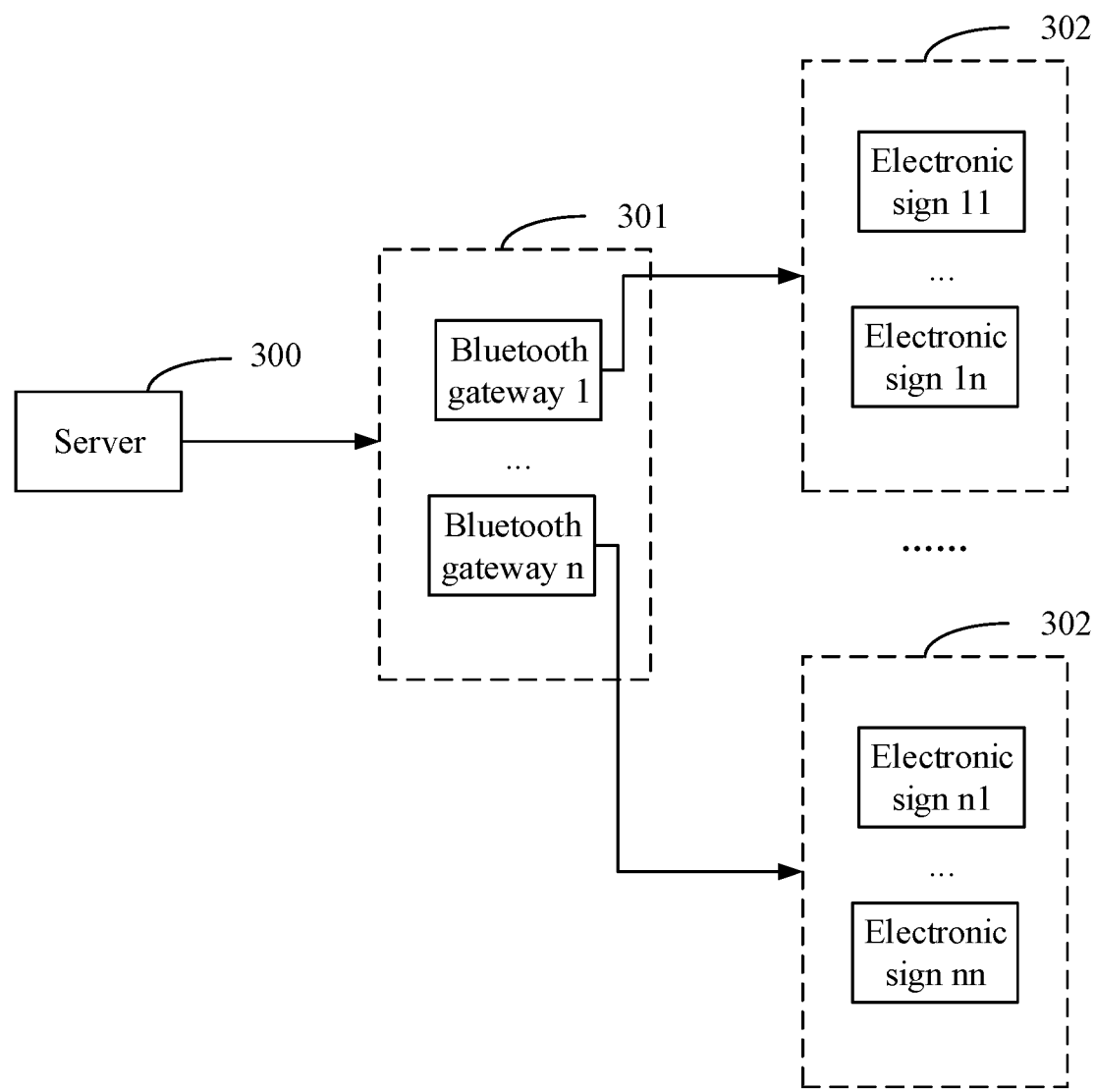
FIG. 3 is a schematic diagram of an intelligent conference system provided by an embodiment of the present disclosure.

As shown in FIG. 3, an embodiment provides an intelligent conference system, including a server 300, Bluetooth gateways 301, and electronic signs 302; where:

the server 300 is configured to acquire the conference information and attendee information of the scheduled conference; and transmit the attendee information to the electronic sign(s) 302 bound with the Bluetooth gateway(s) 301 by means of the Bluetooth gateway(s) 301 corresponding to the conference information for refreshing and displaying; one electronic sign 302 is bound with only one Bluetooth gateway 301.

Figure 4:
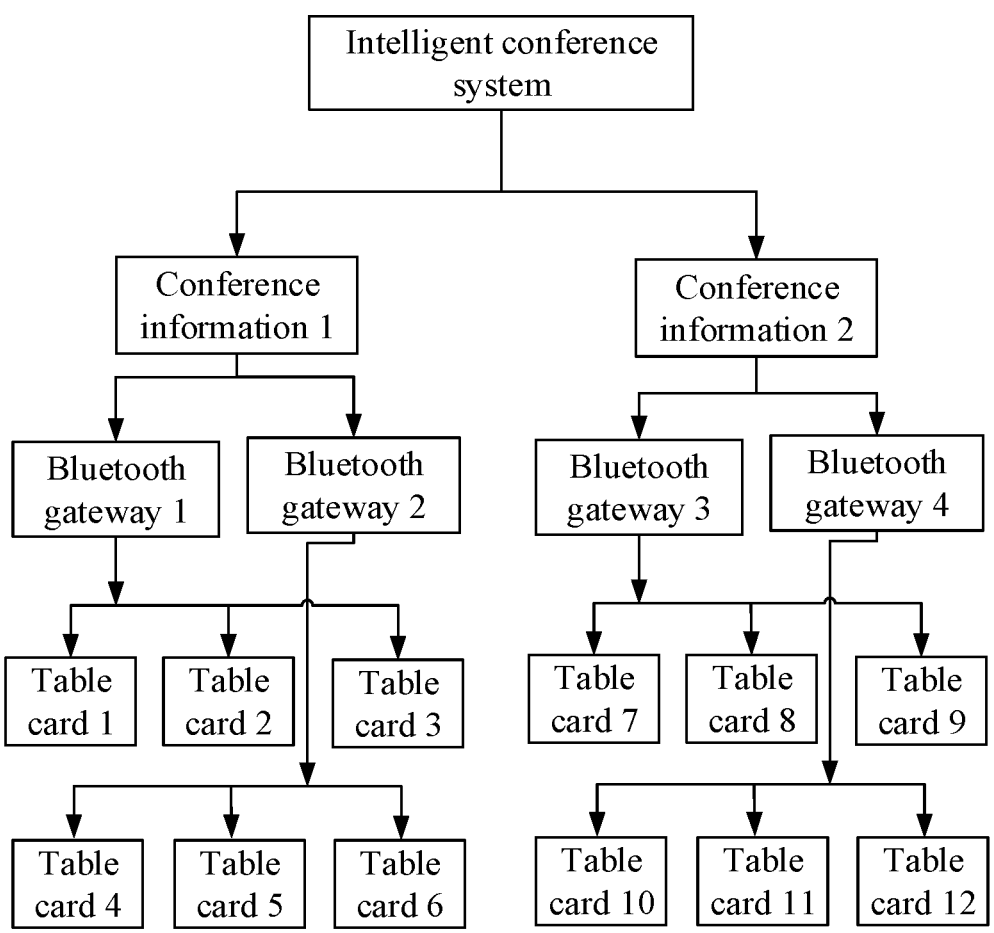
FIG. 4 is a schematic diagram of a network architecture of an intelligent conference system provided by an embodiment of the present disclosure.

As shown in FIG. 4, taking the intelligent conference system includes multiple pieces of conference information, multiple Bluetooth gateways, and multiple electronic signs as an example, a schematic diagram of a network architecture of an intelligent conference system is further provided by the embodiments, in which 2 pieces of conference information is obtained, and each piece of conference information corresponds to 2 Bluetooth gateways, and each Bluetooth gateway is bound with 3 electronic signs. Bluetooth gateways corresponding to different pieces of conference information are different, and electronic signs bound with different Bluetooth gateways are also different. In the network architecture of the intelligent conference system provided in the embodiments, different pieces of conference information are isolated and transmitted, and each Bluetooth gateway is bound with multiple electronic signs, each piece of the conference information corresponds to multiple Bluetooth gateways, and multiple Bluetooth gateways are used to refresh the electronic signs to display synchronously, which improves the efficiency of refreshing and displaying. The attendee information of multiple scheduled conferences can also be refreshed and displayed synchronously.

In some embodiments, if there are multiple scheduled conferences and the conference information of the multiple scheduled conferences are different, for example, the conference rooms of the multiple scheduled conferences are different, and then the attendee information of the plurality of scheduled conferences is transmitted to different Bluetooth gateways, to realize isolation among the attendee information of the scheduled conferences.

In some embodiments, when one piece of the conference information corresponds to the plurality of Bluetooth gateways, the attendee information is transmitted to the plurality of Bluetooth gateways in parallel, so that the plurality of Bluetooth gateways synchronously control the electronic signs bound with the plurality of Bluetooth gateways for refreshing and displaying. Synchronization specifically represents non-strict time same. The method of synchronously controlling the refreshing and displaying of electronic signs can effectively improve the refresh efficiency and reduce the refresh time.

In some embodiments, a binding relationship between the conference room information and the electronic sign(s) can also be established, that is, a binding relationship between conference room(s) and electronic sign(s) is established, so that both the Bluetooth gateway(s) and the electronic sign(s) are bound with the conference room based on the Bluetooth gateway(s) and electronic sign(s) bound with the conference room.

As shown in FIG. 5, a conference template configuration interface is provided by an embodiment. In the conference template configuration interface, a user(s) can add and configure the Bluetooth gateway(s) corresponding to the conference information and configure the binding relationship between the conference room information and the Bluetooth gateway(s). In the conference template configuration interface, and the user(s) can further configure the electronic sign(s) and configure the binding relationship between the conference room information and the electronic sign(s). The communication principle of adding a Bluetooth gateway is that the Bluetooth gateway is added as a device through the mac address on the Web page system. The communication channel for information transmission between the Bluetooth gateway and the server of the intelligent conference system is the message middleware, i.e., message queue, and the communication protocol is the message queuing telemetry transport protocol.

As shown in FIG. 6, a configuration interface for the gateway and the electronic sign is further provided by the embodiments. In the configuration interface, the user can configure the binding relationship between the Bluetooth gateway(s) and the electronic sign(s). The user can also unbind the binding relationship by means of the unbinding operation, e.g., unbinding the binding relationship between the conference room information and the Bluetooth gateway(s). Through the conference template configuration interface, the user can customize the binding relationship among the conference room information, the Bluetooth gateway(s), and the electronic sign(s), or customize the binding relationship between the conference room information and the Bluetooth gateway(s), or perform modification or unbinding, or other operations on the binding relationship.

For example, take the electronic sign as a table card as an example. When registering the table card, the user selects the Bluetooth gateway bound with the table card. According to the user's operation on the web-side, the binding relationship between the table card(s) and the Bluetooth gateway(s) is recorded in the background. Similarly, when adding a conference room, the user binds all the Bluetooth gateways and table cards intended to be used in the conference room to the space of the conference room, so that the background can record the relationship between the conference room(s) and the Bluetooth gateway(s), the relationship between the conference room(s) and the table card(s), and the relationship between the Bluetooth gateway(s) and the table card(s).

In some embodiments, the user can also edit and modify conference information in the conference template configuration interface. The user can also trigger the button "One-click setting table card" to automatically set the electronic sign bound with a certain Bluetooth gateway based on the pre-stored binding relationship between the Bluetooth gateways and the electronic signs, without the user's manually selection.

As shown in FIG. 7, a manual refresh interface for electronic sign is further provided by the embodiments. The manual refresh interface can display attendee information of scheduled conference, and the user can perform update, edit, modification, and other operations on the attendee information.

In some embodiments, the user can trigger the transmit button corresponding to information of each attendee to generate an update instruction for the information of the attendee. For example, the user can click the transmit button corresponding to information of a certain attendee on the manual refresh interface. After clicking the transmit button, the attendee information previously transmitted to the electronic sign will be retransmitted to the electronic sign.

In the implementation, in response to an update instruction for the attendee information from a user, the attendee information is retransmitted to the electronic sign corresponding to the attendee information for refreshing and displaying. The method of manually triggering the attendee information update by the user can solve the problem that one of the electronic signs cannot display the attendee information when automatically updating the attendee information. In this case, the attendee information can be retransmitted to the electronic sign through manual triggering to improve the success rate of refreshing the electronic sign.

Among them, the methods of determining the electronic sign corresponding to the attendee information include but are not limited to any of the following.

1) The electronic sign corresponding to the attendee information is determined based on the Bluetooth gateway corresponding to the conference information of the scheduled conference related to the attendee information.

In the implementation, the electronic sign corresponding to the attendee information related to the conference information is determined based on the Bluetooth gateway corresponding to the conference information and the electronic sign bound with the Bluetooth gateway.

2) An electronic sign specified by the user is used as the electronic sign corresponding to the attendee information.

In the implementation, the user can specify a certain electronic sign as the electronic sign corresponding to the attendee information. The specified electronic sign may be the electronic sign bound with the Bluetooth gateway corresponding to the conference information, or may not be the electronic sign bound with the Bluetooth gateway corresponding to the conference information.

Through the manual refresh interface, the user can manually refresh the attendee information that has not yet been successfully displayed, which triggers the attendee information to be retransmitted to the bound electronic sign for refreshing and displaying. The success rate of refresh can be improved by combining automatic refresh and manual refresh.

In some embodiments, the user can perform operations such as edit, modification, and deleting on the attendee information by manually refreshing the interface.

In the implementation, the user can edit the attendee information. For example, the user triggers an edit button corresponding to the attendee information to generate an editing instruction. In response to the user's editing instruction for the attendee information, the attendee information is edited. The edited attendee information is transmitted to the electronic sign corresponding to the attendee information for refreshing and displaying.

In the implementation, the user can also modify the attendee information. For example, the user triggers a modification button corresponding to the attendee information to generate a modification instruction. In response to the user's modification instruction for the attendee information, the attendee information is modified. The modified attendee information is retransmitted to the electronic sign corresponding to the attendee information for refreshing and displaying.

The electronic sign(s) corresponding to the attendee information is determined based on the Bluetooth gateway(s) corresponding to the conference information of the scheduled conference related to the attendee information, or an electronic sign(s) specified by the user is used as the electronic sign(s) corresponding to the attendee information.

If the electronic sign corresponding to the attendee information is determined based on the Bluetooth gateway corresponding to the conference information of the scheduled conference related to the attendee information, then the electronic sign is the electronic sign bound with the Bluetooth gateway. If the electronic sign corresponding to the attendee information is an electronic sign specified by the user, the user can redistribute an electronic sign corresponding to the attendee information on the manual refresh interface, and designate one electronic sign for the attendee information. In this situation, when the original electronic sign has a transmit failure and cannot refresh and display attendee information normally, a new electronic sign can be replaced, and a corresponding relationship between the attendee information and the new electronic sign(s) can be established, in which the attendee information may be matched with the ID of the electronic sign, or the attendee information may be matched with other information representing the uniqueness of the electronic sign.

A binding mechanism among the conference information, the Bluetooth gateway and the electronic sign and a manually triggered refresh function of attendee information in the multi-conference scenario are provided by the embodiments. When the user add the electronic sign(s) to the conference room, he/she need to specify the Bluetooth gateway(s) corresponding to the electronic sign(s), and establish a one-to-one correspondence between the Bluetooth gateway(s) and the electronic sign(s), that is, one electronic sign only corresponds to one Bluetooth gateway. After the binding relationship between the Bluetooth gateway(s) and the electronic sign(s) is confirmed, the Bluetooth gateway(s) and the electronic sign(s) are bounded to the corresponding conference room information contained in the conference information, a corresponding relationship between the hardware device(s) and the conference room(s) is established, and the conference room supports binding of multiple Bluetooth gateways. It should be noted that the electronic sign(s) bound with the Bluetooth gateway should be within the coverage of the Bluetooth gateway.

By the specified binding relationship, the isolation among conference information in the multi-conference scenario can be achieved to avoid mutual interference between conference information. At the same time, after the isolation among conference data is achieved, multiple Bluetooth gateways can be bound with the conference room(s) to achieve the effect of grouped parallel refreshing, which can doubly shorten the refreshing time and meet the timeliness of refreshing multiple electronic signs.

In the specific implementation, after completing the configuration of the conference room hardware device(s) (including establishing the binding relationship among the conference room information, the Bluetooth gateway(s), and the electronic sign(s)), the user makes a conference reservation by entering the conference reservation interface. After the reservation is completed, the user add attendee information by entering the conference details; the attendee information includes information of an internal user(s) and an external user(s). The information of the internal user(s) is stored in the intelligent conference system, and the information of the external user(s) is manually added by the user. The information of the external user(s) can be deleted after the conference ends. For example, the electronic sign(s) can be automatically refreshed during 15 minutes before the conference begins, and the user can view the refresh information of the corresponding electronic sign by means of the refresh status of the attendee information.

In some embodiments, a manual refreshing method is provided. In a conference scenario, in addition to high requirements for the timeliness of refreshing table card, there are also high requirements for the accuracy of refreshing table card. Due to various factors affecting the refreshing rate of terminal hardware devices, the requirement of 100% refreshing rate cannot be met. Even with automatic refresh compensation, it is impossible to avoid the failure to refresh caused by damage to terminal hardware devices. In the scheme, a manual trigger function is added when the requirements of conference information isolation and timeliness of conference information are satisfied. For example, the user can update attendee information and replace the table card hardware device or table card template by manual triggering from 3 minutes before the conference begins to 25 minutes before the conference ends. The manual triggering function can compensate for the inability of the automatic refresh mechanism to achieve 1000 success rate (including the number of refreshes and the comprehensive success rate of a single refresh) and satisfy the flexibility of the user in refreshing table cards. Taking the electronic sign as a table card as an example, the compliance status of the test data in the embodiments is as shown in the following table.

TABLE 1 compliance status of indicators

| Indicators requirements | Test result | Compliance status |
|---|---|---|
| Response time 200 ms, (in which response time of seating interface <900 ms, response time of adding conference <500 ms, response time of one-click setting table card <300 ms) | Response time of adding conference interface of 457 ms, response time of seating interface of 847 ms, response time of one-click setting table card of 211 ms | Satisfy |
| Stable operation for 8 hours | Continuous normal operation for 8 hours | Satisfy |
| Refresh success rate of 100% | Automatic refresh success rate of 90%; Success rate of automatic refresh combined with manual refresh of 100% | Satisfy |

An operation specification is also provided by the embodiments. In some embodiments, the modifying instruction from the user for the attendee information is an instruction which is received within the first time point before the scheduled conference begins to the second time point before the scheduled conference ends and is generated by the user modifying the attendee information of the scheduled conference. In the implementation, the modifying instruction for the attendee information from the user is received from a first time point before the scheduled conference begins to a second time point before the scheduled conference ends. For example, from 3 minutes before the conference begins to 25 minutes before the conference ends, the user can modify the attendee information and retransmitted the modified attendee information to the corresponding electronic sign(s) for refreshing and displaying.

In some embodiments, an editing instruction for the conference information and/or the attendee information of the scheduled conference from the user is received within a first preset time duration before the scheduled conference begins. For example, within 15 minutes before the conference begins, the user can freely edit at least one piece of the conference information or the attendee information.

In some embodiments, the editing instruction for the conference information and/or the attendee information of the scheduled conference from the user is refused within a second preset time duration before the scheduled conference begins, where the second preset time duration is after the first preset time duration. For example, the user cannot edit the conference information and the attendee information within 3 to 15 minutes before the conference begins.

For example, the provided operating specifications are as follows.

Rule 1, the user can freely edit at least one piece of the conference information or the attendee information within 15 minutes before the conference begins.

Rule 2, the user cannot edit conference information and attendee information within 3 to 15 minutes before the conference begins.

Rule 3, the user can modify the attendee information and retransmitted the modified attendee information to the corresponding electronic sign(s) for refreshing and displaying from 3 minutes before the conference begins to 25 minutes before the conference ends.

Rule 4, the duration of a single conference must be half an hour or more.

Rule 5, the user cannot operate on ended or canceled conference information.

The time acquisition method is as follows: based on the server of the intelligent conference system, in the interface time class of the Service layer of the Java programming SpringBoot, the current time of the server is acquired by using the Date object in JDK1.0, and the time related to this conference (such as 15 minutes before the conference begins and 25 minutes before the conference ends) is acquired by using the Calendar object of JDK1.1. Based on the comparison of the two types of time, determine whether the current time is an operable time.

In the embodiments, the timeliness of simultaneously refreshing multiple electronic signs can be achieved by setting the number of Bluetooth gateways. By adding the manual triggering function, the flexibility of refreshing the electronic sign(s) in the conference scenario can be improved, and the problem that the success rate of refreshing the electronic sign cannot satisfy the conference requirements can be solved. The test results show that the success rate of the automatic refresh mechanism in the multi-conference scenario is only 90% (assuming that the hardware device is not damaged). In the schemes of the embodiments, the success rate can reach 100% by adding the manually triggering function of updating attendee information.

Embodiment 2: based on the same inventive concept, an embodiment of the present disclosure further provides an electronic device. Since the electronic device is an electronic device in the method in the embodiments of the present disclosure, and the principle of solving the problem by the electronic device is the same as that of the method, the implementation of the electronic device can be referred to the implementation of the method, and repeated details will not be repeated.

As shown in FIG. 8, the electronic device includes a processor 800 and a memory 801. The memory 801 is configured to store programs executable by the processor 800. The processor 800 is configured to read the programs in the memory 801 and execute the following steps:
  acquiring conference information and attendee information of a scheduled conference; where the conference information includes a Bluetooth gateway corresponding to the conference information;
  transmitting the attendee information to an electronic sign bound with the Bluetooth gateway by means of the Bluetooth gateway corresponding to the conference information; where when there are a plurality of Bluetooth gateways, the electronic sign is bound with only one Bluetooth gateway; and
  displaying the attendee information by means of refreshing the electronic sign.

As an optional implementation, when there are a plurality pieces of conference information and the plurality of Bluetooth gateways, one piece of the conference information corresponds to at least one of the plurality of Bluetooth gateways, and different pieces of conference information correspond to different Bluetooth gateways.

As an optional implementation, when there are the plurality of Bluetooth gateways and a plurality of electronic signs, one Bluetooth gateway is bound with at least one of the plurality of electronic signs, and different Bluetooth gateways are bound with different electronic signs.

As an optional implementation, when there are a plurality of scheduled conferences and the conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

As an optional implementation, when one piece of conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

As an optional implementation, the processor 800 is further configured to:
  retransmit the attendee information to the electronic sign corresponding to the attendee information for refreshing and displaying in response to an update instruction for the attendee information from a user;
  where the electronic sign corresponding to the attendee information is determined based on the Bluetooth gateway corresponding to the conference information of the scheduled conference related to the attendee information, or an electronic sign specified by the user is used as the electronic sign corresponding to the attendee information.

As an optional implementation, the processor 800 is further configured to:
  edit the attendee information in response to an editing instruction for the attendee information from a user, and transmitting edited attendee information to the electronic sign corresponding to the attendee information for refreshing and displaying; and/or,
  modify the attendee information in response to a modifying instruction for the attendee information from a user, and retransmitting modified attendee information to the electronic sign corresponding to the attendee information for refreshing and displaying;
  where the electronic sign corresponding to the attendee information is determined based on the Bluetooth gateway corresponding to the conference information of the scheduled conference related to the attendee information, or an electronic sign specified by the user is used as the electronic sign bounded with the attendee information.

As an optional implementation, the processor 800 is further configured to:
  receive a modifying instruction for the attendee information from a user from a first time point before the scheduled conference begins to a second time point before the scheduled conference ends.

As an optional implementation, the processor 800 is further configured to:
  receive an editing instruction for the conference information and/or the attendee information of the scheduled conference from a user within a first preset time duration before the scheduled conference begins.

As an optional implementation, the processor 800 is further configured to:
  stop receiving the editing instruction for the conference information and/or the attendee information of the scheduled conference from a user within a second preset time duration before the scheduled conference begins;
  where the second preset time duration is after the first preset time duration.

Embodiment 3: based on the same inventive concept, an embodiment of the present disclosure also provides a device for refreshing electronic sign. Since the device is an device in the method in the embodiments of the present disclosure, and the principle of solving the problem of the device is the same as that of the method, the implementation of the device can be referred to the implementation of the method, and repeated details will not be repeated.

Figure 9:
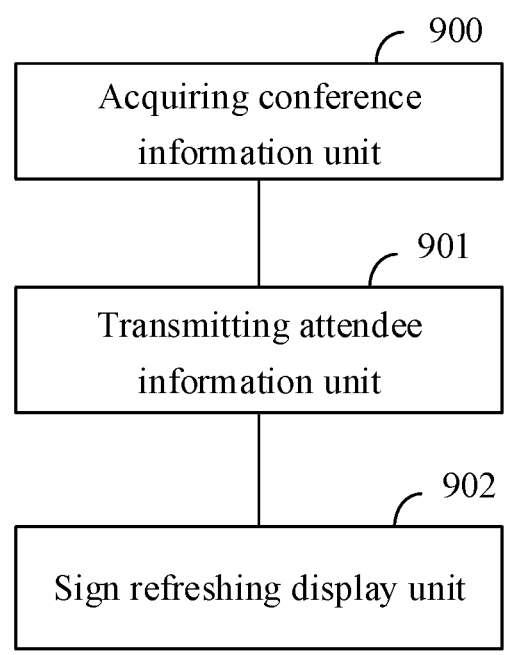
FIG. 9 is a schematic diagram of a device for refreshing electronic sign provided by an embodiment of the present disclosure.

As shown in FIG. 9, the device includes:
- an acquiring conference information unit 900, configured to acquire conference information and attendee information of a scheduled conference; where the conference information includes a Bluetooth gateway corresponding to the conference information;
- a transmitting attendee information unit 901, configured to transmit the attendee information to an electronic sign bound with the Bluetooth gateway by means of the Bluetooth gateway corresponding to the conference information; when there are a plurality of Bluetooth gateways, the electronic sign is bound with only one Bluetooth gateway; and
- a sign refreshing display unit 902, configured to display the attendee information by means of refreshing the electronic sign.

As an optional implementation, when there are a plurality pieces of conference information and the plurality of Bluetooth gateways, one piece of the conference information corresponds to at least one of the plurality of Bluetooth gateways, and different pieces of conference information correspond to different Bluetooth gateways.

As an optional implementation, when there are the plurality of Bluetooth gateways and a plurality of electronic signs, one Bluetooth gateway is bound with at least one of the plurality of electronic signs, and different Bluetooth gateways are bound with different electronic signs.

As an optional implementation, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

As an optional implementation, when one piece of the conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

As an optional implementation, the electronic device further includes a first refresh unit, configured to:
- retransmit the attendee information to the electronic sign corresponding to the attendee information for refreshing and displaying in response to an update instruction for the attendee information from a user;
- where the electronic sign corresponding to the attendee information is determined based on the Bluetooth gateway corresponding to the conference information of the scheduled conference related to the attendee information, or an electronic sign specified by the user is used as the electronic sign corresponding to the attendee information.

As an optional implementation, the electronic device further includes a second refresh unit, configured to:
- edit the attendee information in response to an editing instruction for the attendee information from a user, and transmit edited attendee information to the electronic sign corresponding to the attendee information for refreshing and displaying; and/or,
- modify the attendee information in response to a modifying instruction for the attendee information from a user, and retransmit modified attendee information to the electronic sign corresponding to the attendee information for refreshing and displaying;
- where the electronic sign corresponding to the attendee information is determined based on the Bluetooth gateway corresponding to the conference information of the scheduled conference related to the attendee information, or an electronic sign specified by the user is used as the electronic sign bounded with the attendee information.

As an optional implementation, the electronic device further includes a modification unit, configured to:
- receive a modifying instruction for the attendee information from a user from a first time point before the scheduled conference begins to a second time point before the scheduled conference ends.

As an optional implementation, the electronic device further includes an editing unit, configured to:
- receive an editing instruction for the conference information and/or the attendee information of the scheduled conference from a user within a first preset time duration before the scheduled conference begins.

As an optional implementation, the electronic device further includes a stop unit, configured to:
- stop receiving the editing instruction for the conference information and/or the attendee information of the scheduled conference from a user within a second preset time duration before the scheduled conference begins;
- where the second preset time duration is after the first preset time duration.

Based on the same inventive concept, an embodiment of the present disclosure also provide a non-transitory computer storing computer programs thereon, where the computer programs, when executed by a processor, implement the following steps:
- acquiring conference information and attendee information of a scheduled conference; where the conference information includes a Bluetooth gateway corresponding to the conference information;
- transmitting the attendee information to an electronic sign bound with the Bluetooth gateway by means of the Bluetooth gateway corresponding to the conference information; when there are a plurality of Bluetooth gateways, the electronic sign is bound with only one Bluetooth gateway; and
- displaying the attendee information by means of refreshing the electronic sign.

Those skilled in the art will appreciate that embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product implemented on one or more computer available storage media (including, but not limited to, magnetic disk storage, optical storage, etc.) containing computer available program code therein.

The disclosure is described with reference to flowchart illustrations and/or block diagrams of methods, apparatus (systems), and computer program products according to embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device produce a use equipment used to implement the functions specified in a process or processes in a flow diagram and/or a block or blocks in a block diagram.

These computer program instructions may also be stored in a computer-readable memory that causes a computer or other programmable data processing device to operate in a particular manner, such that the instructions stored in the computer-readable memory produce an article of manufacture including the instructed device. The equipment implements the functions specified in a process or processes in the flow diagram and/or in a block or blocks in the block diagram.

These computer program instructions may also be loaded onto a computer or other programmable data processing device to perform a series of operating steps on the computer or other programmable device to generate computer-implemented processing. The instructions executed on the computer or other programmable devices provide steps for implementing the functions specified in one or more processes of a flowchart diagram and/or a block or blocks of a block diagram.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for refreshing electronic sign, comprising:
   acquiring conference information and attendee information of a scheduled conference; wherein the conference information comprises a Bluetooth gateway corresponding to the conference information;
   transmitting the attendee information to an electronic sign bound with the Bluetooth gateway by means of the Bluetooth gateway corresponding to the conference information; wherein, when there are a plurality of Bluetooth gateways, the electronic sign is bound with only one Bluetooth gateway; and
   displaying the attendee information by means of refreshing the electronic sign;
   wherein the method further comprises receiving an editing instruction for the conference information and/or the attendee information of the scheduled conference from a user within a first preset time duration before the scheduled conference begins.

2. The method according to claim 1, wherein, when there are a plurality pieces of conference information and the plurality of Bluetooth gateways, one piece of the conference information corresponds to at least one of the plurality of Bluetooth gateways, and different pieces of conference information correspond to different Bluetooth gateways.

3. The method according to claim 2, wherein, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

4. The method according to claim 2, wherein, when one piece of conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

5. The method according to claim 1, wherein, when there are the plurality of Bluetooth gateways and a plurality of electronic signs, one Bluetooth gateway is bound with at least one of the plurality of electronic signs, and different Bluetooth gateways are bound with different electronic signs.

6. The method according to claim 1, further comprising:
   retransmitting the attendee information to the electronic sign corresponding to the attendee information for refreshing and displaying in response to an update instruction for the attendee information from a user;
   wherein the electronic sign corresponding to the attendee information is determined based on the Bluetooth gateway corresponding to the conference information of the scheduled conference related to the attendee information, or an electronic sign specified by the user is used as the electronic sign corresponding to the attendee information.

7. The method according to claim 1, further comprising:
   editing the attendee information in response to an editing instruction for the attendee information from a user, and transmitting edited attendee information to the electronic sign corresponding to the attendee information for refreshing and displaying; and/or,
   modifying the attendee information in response to a modifying instruction for the attendee information from a user, and retransmitting modified attendee information to the electronic sign corresponding to the attendee information for refreshing and displaying;
   wherein the electronic sign corresponding to the attendee information is determined based on the Bluetooth gateway corresponding to the conference information of the scheduled conference related to the attendee information, or an electronic sign specified by the user is used as the electronic sign bounded with the attendee information.

8. The method according to claim 1, further comprising:
   receiving a modifying instruction for the attendee information from a user from a first time point before the scheduled conference begins to a second time point before the scheduled conference ends.

9. The method according to claim 1, further comprising:
   stopping receiving the editing instruction for the conference information and/or the attendee information of the scheduled conference from a user within a second preset time duration before the scheduled conference begins;
   wherein the second preset time duration is after the first preset time duration.

10. An electronic device, comprising a processor and a memory, the memory is configured to store programs executable by the processor, and the processor is configured to read the programs in the memory and execute:
    acquiring conference information and attendee information of a scheduled conference; wherein the conference information comprises a Bluetooth gateway corresponding to the conference information;

transmitting the attendee information to an electronic sign bound with the Bluetooth gateway by means of the Bluetooth gateway corresponding to the conference information; wherein, when there are a plurality of Bluetooth gateways, the electronic sign is bound with only one Bluetooth gateway; and displaying the attendee information by means of refreshing the electronic sign;

wherein the processor is further configured to read the programs in the memory and execute:

receiving an editing instruction for the conference information and/or the attendee information of the scheduled conference from a user within a first preset time duration before the scheduled conference begins.

11. The electronic device according to claim 10, wherein, when there are a plurality pieces of conference information and the plurality of Bluetooth gateways, one piece of the conference information corresponds to at least one of the plurality of Bluetooth gateways, and different pieces of conference information correspond to different Bluetooth gateways.

12. The electronic device according to claim 11, wherein, when there are a plurality of scheduled conferences and conference information of the plurality of scheduled conferences is different, attendee information of the plurality of scheduled conferences is transmitted to different Bluetooth gateways corresponding to the conference information of the plurality of scheduled conferences, to realize isolation among the attendee information of the plurality of scheduled conferences.

13. The electronic device according to claim 11, wherein, when one piece of conference information corresponds to the plurality of Bluetooth gateways, the attendee information is transmitted to the plurality of Bluetooth gateways in parallel, so that the plurality of Bluetooth gateways synchronously control electronic signs bound with the plurality of Bluetooth gateways for refreshing and displaying.

14. The electronic device according to claim 10, wherein, when there are the plurality of Bluetooth gateways and a plurality of electronic signs, one Bluetooth gateway is bound with at least one of the plurality of electronic signs, and different Bluetooth gateways are bound with different electronic signs.

15. The electronic device according to claim 10, wherein the processor is further configured to read the programs in the memory and execute:

retransmitting the attendee information to the electronic sign corresponding to the attendee information for refreshing and displaying in response to an update instruction for the attendee information from a user;

wherein the electronic sign corresponding to the attendee information is determined based on the Bluetooth gateway corresponding to the conference information of the scheduled conference related to the attendee information, or an electronic sign specified by the user is used as the electronic sign corresponding to the attendee information.

16. The electronic device according to claim 10, wherein the processor is further configured to read the programs in the memory and execute:

editing the attendee information in response to an editing instruction for the attendee information from a user, and transmitting edited attendee information to the electronic sign corresponding to the attendee information for refreshing and displaying; and/or, modifying the attendee information in response to a modifying instruction for the attendee information from a user, and retransmitting modified attendee information to the electronic sign corresponding to the attendee information for refreshing and displaying;

wherein the electronic sign corresponding to the attendee information is determined based on the Bluetooth gateway corresponding to the conference information of the scheduled conference related to the attendee information, or an electronic sign specified by the user is used as the electronic sign bounded with the attendee information.

17. The electronic device according to claim 10, wherein the processor is further configured to read the programs in the memory and execute:

receiving a modifying instruction for the attendee information from a user from a first time point before the scheduled conference begins to a second time point before the scheduled conference ends.

18. The electronic device according to claim 10, wherein the processor is further configured to read the programs in the memory and execute:

stopping receiving the editing instruction for the conference information and/or the attendee information of the scheduled conference from a user within a second preset time duration before the scheduled conference begins;

wherein the second preset time duration is after the first preset time duration.

* * * * *